US006460912B2

(12) United States Patent
Moore et al.

(10) Patent No.: US 6,460,912 B2
(45) Date of Patent: *Oct. 8, 2002

(54) LOAD RESTRAINING VEHICULAR BARRIER DEVICE

(75) Inventors: Donal Moore, Birmingham; Brian Bateman, Rochester Hills, both of MI (US)

(73) Assignee: Polytech Netting, L.P., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/951,802

(22) Filed: Sep. 12, 2001

(65) Prior Publication Data

US 2002/0030372 A1 Mar. 14, 2002

Related U.S. Application Data

(63) Continuation of application No. 09/609,520, filed on Jul. 3, 2000, now Pat. No. 6,302,463.

(51) Int. Cl.[7] .................................................. B60P 7/135
(52) U.S. Cl. ...................................... 296/24.1; 410/118
(58) Field of Search .............................. 296/24.1, 37.16, 296/65.16; 410/117, 118, 129, 141; 24/68 CD, 265 CD; 224/543, 557

(56) References Cited

U.S. PATENT DOCUMENTS

| | | | | |
|---|---|---|---|---|
| 1,739,893 A | * | 12/1929 | Fedderman | 24/265 CD |
| 2,669,402 A | | 2/1954 | Del Mar | 244/121 |
| 2,854,931 A | | 10/1958 | Campbell | 105/369 |
| 2,997,331 A | | 8/1961 | Kudner | 296/24 |
| 3,044,800 A | | 7/1962 | Wicker | 280/150 |
| 3,049,373 A | | 8/1962 | B'ggers | 296/106 |
| 3,169,781 A | | 2/1965 | Arbuzzino | 280/150 |
| 3,190,686 A | | 6/1965 | Smiler | 296/24 |
| 3,367,707 A | | 2/1968 | Merriweather | 296/24 |
| 3,486,723 A | | 12/1969 | Harrison | 244/118 |
| 3,534,998 A | | 10/1970 | Johnson et al. | 296/24 |
| 3,695,698 A | | 10/1972 | Trump | 297/390 |

(List continued on next page.)

FOREIGN PATENT DOCUMENTS

| | | | | |
|---|---|---|---|---|
| DE | 3419758 A1 | | 11/1985 | |
| DE | 3738931 A1 | | 6/1989 | |
| DE | 4229849 | * | 3/1994 | 296/24.2 |
| EP | 211248 | * | 2/1987 | 296/65.16 |
| FR | 2 470 033 | | 6/1977 | |
| GB | 2 206 548 A | | 1/1988 | |
| JP | 61 193949 | | 8/1986 | |
| JP | 71443 | * | 3/1988 | 296/24.1 |

OTHER PUBLICATIONS

Approval of Seats, Anchorages Issue 4: Regulation No. 17, Apr. 1999.

Primary Examiner—Dennis H. Pedder
(74) Attorney, Agent, or Firm—Young & Basile, P.C.

(57) ABSTRACT

A load restraining barrier for use in a motor vehicle, suspended between the passenger compartment and the trunk compartment. The barrier includes a barrier body having a front, a back, a top, a bottom, and two sides, the front facing the trunk compartment, the back facing the passenger compartment, the top adjacent the package tray, the bottom adjacent the vehicle's bottom wall, and the two sides adjacent the vehicle's two side walls. A substantially horizontal reinforcing member extends between the two sides and is located at or below a midpoint between the top and the bottom. The barrier body is attached to the vehicle's package tray, and is releasably attached to at least one of the bottom wall and the side walls. When the barrier is installed at the trunk forward end, cargo in the trunk compartment is restrained from entering the passenger compartment under predetermined frontal crash conditions.

20 Claims, 7 Drawing Sheets

U.S. PATENT DOCUMENTS

| | | | |
|---|---|---|---|
| 4,173,369 A | 11/1979 | Roggin | 296/24 |
| 4,213,636 A | 7/1980 | King | 280/749 |
| 4,215,895 A | 8/1980 | Phillips | 292/202 |
| 4,303,367 A * | 12/1981 | Bott | 410/68 X |
| 4,368,902 A | 1/1983 | McDowell | 280/749 |
| 4,763,944 A | 8/1988 | Fry et al. | 296/50 |
| 4,919,467 A | 4/1990 | Guimelli | 296/24.1 |
| 5,026,231 A | 6/1991 | Moore | 410/118 |
| 5,090,856 A | 2/1992 | Moore | 410/118 |
| 5,121,958 A | 6/1992 | Goeden et al. | 296/37.1 |
| 5,186,587 A | 2/1993 | Moore | 410/118 |
| 5,427,486 A * | 6/1995 | Green | 296/24.1 X |
| 5,772,370 A * | 6/1998 | Moore | 296/37.16 X |
| 5,954,380 A * | 9/1999 | Ament et al. | 296/24.1 |
| 6,302,463 B1 * | 10/2001 | Moore et al. | 296/24.1 |

* cited by examiner

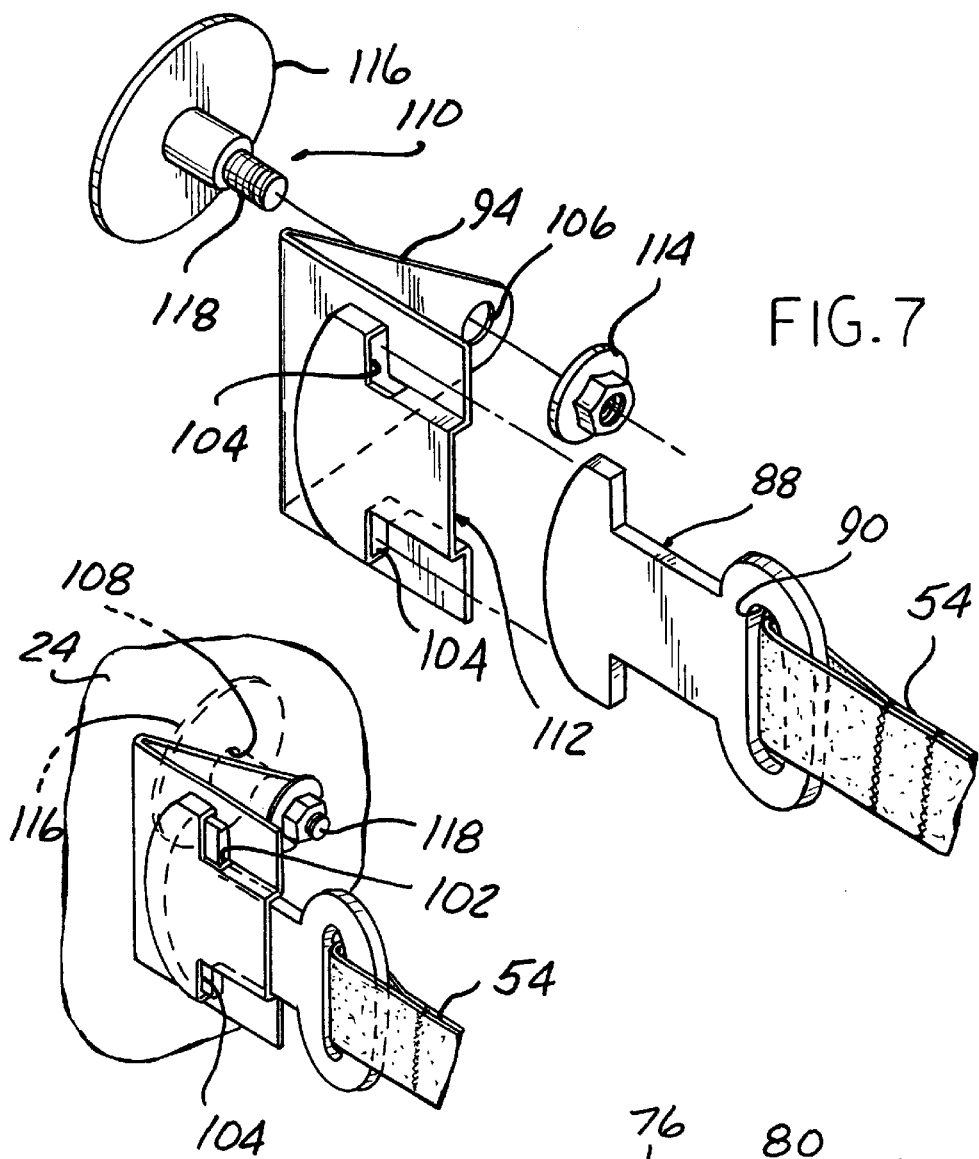
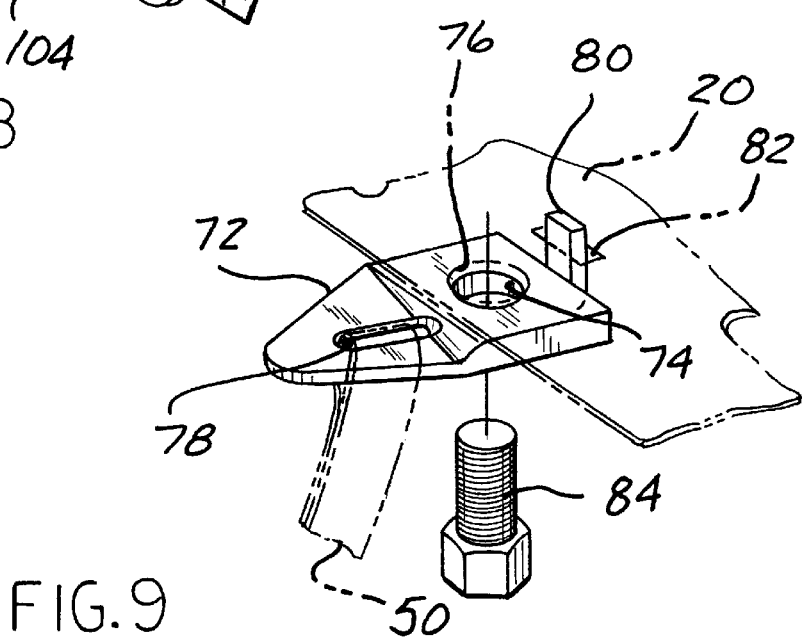

LOAD RESTRAINING VEHICULAR BARRIER DEVICE

CROSS REFERENCE TO CO-PENDING APPLICATION

This application is a continuation of co-pending application Ser. No. 09/609,520, filed on Jul. 3, 2000, now U.S. Pat. No. 6,302,463 in the name of Moore, et al. and entitled "LOAD RESTRAINING VEHICULAR BARRIER DEVICE".

BACKGROUND OF THE INVENTION

The present invention relates generally to vehicular barrier devices, and, more particularly, to such a barrier device which is relatively lightweight, while advantageously preventing the inadvertent passage of cargo from the trunk to the passenger compartment.

Manufacturers of passenger and cargo vehicles, such as automobiles (including SUVs and the like), trucks, trains, aircraft, marine craft, and the like, continuously strive to make the vehicles more fuel efficient while at the same time improving the safety for passengers and/or operators of the vehicles. One way in which fuel may be conserved is to make the vehicle weigh less. As such, particularly in automobiles, alternative materials such as polymeric materials have replaced metal in many areas of the vehicle.

Many years ago, manufacturers generally eliminated the heavy, metal bulkhead between the trunk and passenger compartments which had often been found in conventional sedan-type automobiles. Further, due to the desirability of having a means for transporting oversized cargo, manufacturers began to design and sell fold-down seats to accommodate pass-through cargo from the trunk to the passenger compartments. However, safety requirements relating to the restraint of cargo within the trunk under certain conditions sometimes necessitated finding a replacement for the metal bulkhead. Further, it was unfortunately discovered that the latching mechanisms for fold-down seats sometimes were not strong enough to withstand forces experienced under some frontal crash conditions. Tragically, due to passengers being restrained from bending over due to the 3 point passenger passive restraint systems, such latching mechanism failures could possibly result in injury to passengers.

Although many lighter materials exist, these materials generally do not pass safety requirements since they often fail in restraining cargo in the trunk from inadvertently entering the passenger compartment. The suitable replacement materials which do exist are either cost prohibitive, or for strength they must be much wider than standard sheet metal used - - - as such, they therefore cannot fit within the space constraints of the automobile.

One such replacement is disclosed in U.S. Pat. No. 5,026,231 issued in 1991. The automotive barrier net disclosed therein was a suitable metal bulkhead replacement; and in certain situations, may yet be a suitable replacement therefor. However, since the invention of that barrier net, more stringent safety standards have been proposed relating to the restraint of cargo within the trunk area.

An example of such a requirement is found in the United Nations "Agreement Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions," Addendum 16: Regulation No. 17, Revision 3, Amendment 3, Nov. 4, 1998 (as printed April 1999), which publication is incorporated herein by reference in its entirety. Regulation No. 17 is entitled "Uniform Provisions Concerning the Approval of Vehicles with regard to the Seats, their Anchorages and Head Restraints."

Annex 9 of Regulation No. 17 defines the test procedure for devices intended to protect the occupants against displacement of luggage. Paragraph 2 of Annex 9 of Reg. No. 17 specifies that two blocks each having a mass of 18 kg are to be placed in the trunk area. Paragraph 2 of Annex 7 of Reg. No. 17 defines the conditions for the standardized vehicular crash test; and specifies that the speed on impact shall be between 48.3 km/h and 53.1 km/h. Paragraph 6.3.1 of Reg. No. 17 states that a longitudinal horizontal deceleration of not less than 20 (1 g being approximately equal to 9.8 m/s$^2$) shall be applied for 30 milliseconds in the forward direction to the whole shell of the vehicle in accordance with the requirements of Annex 7. Upon completion of such testing, the 18 kg blocks should not enter the passenger area.

This rather stringent requirement generally is not met with many current automobiles. One alternative for meeting this requirement would be to reinforce the rearmost passenger seats with sheet metal. However, major drawbacks exist with this alternative, a few of which are that the sheet metal would add at least about 25 pounds to the weight of the automobile; it would be difficult and time consuming to design and test seat latch mechanisms which could withstand high enough loads under certain crash conditions; and retooling expenses would be very high.

Thus, it is an object of the present invention to provide a load restraining barrier device which would advantageously pass applicable safety requirements. It is a further object of the present invention to provide such a device which may be incorporated into current automotive designs with minimal changes thereto, either as an OEM part or as an after-market part. Yet further, it is an object of the present invention to provide such a device which is lightweight and relatively inexpensive to manufacture. Still further, it is an object of the present invention to provide such a device which may be detached to advantageously provide pass-through cargo storage if desired. It is yet another object of the present invention to provide such a device which may incorporate convenience netting therewith to provide secure and/or long-term cargo storage.

SUMMARY OF THE INVENTION

The present invention addresses and solves the above-mentioned problems and meets the enumerated objects and advantages, as well as others not enumerated, by providing a load restraining barrier device for use in a motor vehicle, the vehicle having a body with a passenger compartment and a trunk compartment, the trunk compartment having a forward end with a top wall comprising a package tray, a bottom wall, and two opposed side walls extending substantially upwardly from the bottom wall. The barrier device comprises a barrier body having a predetermined geometric shape and disposed at the trunk forward end and suspended between the passenger compartment and the trunk compartment, the barrier body having a front, a back, a top, a bottom, and two opposed sides, the front adapted to face the trunk compartment, the back adapted to face the passenger compartment, the top adapted to be adjacent the package tray, the bottom adapted to be adjacent the bottom wall, and the two opposed sides adapted to be adjacent the two opposed side walls. A substantially horizontal reinforcing member extends between the two opposed sides and is located substantially at or below a midpoint between the top and the bottom. Means are provided for attaching the top to the package tray, and means are also provided for releasably attaching the bottom to at least one of the bottom wall and the opposed side walls.

When the barrier device of the present invention is installed at the trunk forward end and suspended between the passenger compartment and the trunk compartment, cargo of a predetermined mass in the trunk, compartment is restrained from entering the passenger compartment under predetermined frontal crash conditions.

BRIEF DESCRIPTION OF THE DRAWINGS

Other objects, features and advantages of the present invention will become apparent by reference to the following detailed description and drawings, in which:

FIG. 7 is an exploded, cutaway perspective view showing one embodiment of the lower attachment means;

FIG. 8 is a cutaway perspective view showing the attachment means of FIG. 7 in its assembled state;

FIG. 9 is a cutaway, exploded perspective view showing an upper attachment means to the package tray;

DETAILED DESCRIPTION OF THE PREFERRED EMBODIMENTS

Figure 1:
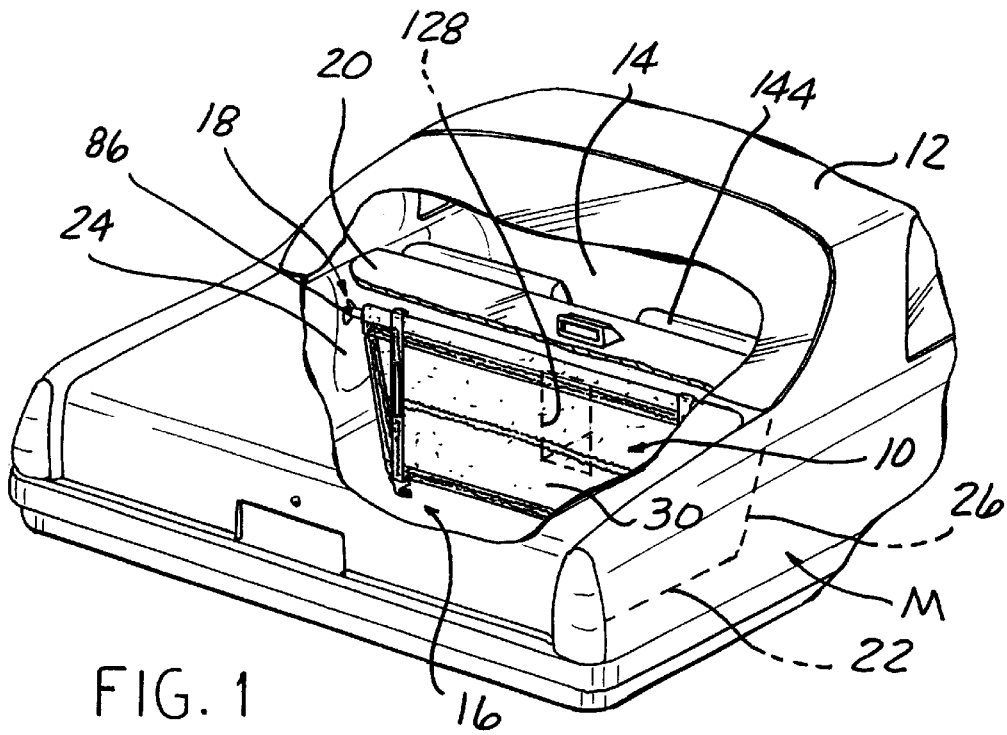
FIG. 1 is a cutaway perspective view showing the barrier device of the present invention installed within a motor vehicle.

Referring now to FIG. 1, the barrier device of the present invention is designated generally as 10. Load restraining barrier device 10 is for use in a motor vehicle, including but not limited to automobiles (including SUVs and the like), trucks, trains, aircraft, marine craft, and the like. Motor vehicle M as shown in the drawings represents an automobile, specifically a sedan and/or coupe. Vehicle M has a body 12 with a passenger compartment 14 and a trunk compartment 16. The trunk compartment 16 has a forward end 18 with a top wall comprising a package tray 20, a bottom wall 22, and two opposed side walls 24, 26 extending substantially upwardly from the bottom wall 22.

The barrier device 10 comprises a barrier body 28 having a predetermined shape and adapted to be disposed at the trunk forward end 18 and suspended between the passenger compartment 14 and the trunk compartment 16. Barrier body 28 may be of any size and/or shape, including but not limited to rectangular, trapezoidal, and/or any geometric shape as desired and/or necessitated by the particular vehicle into which barrier device 10 will be installed.

Figure 12:
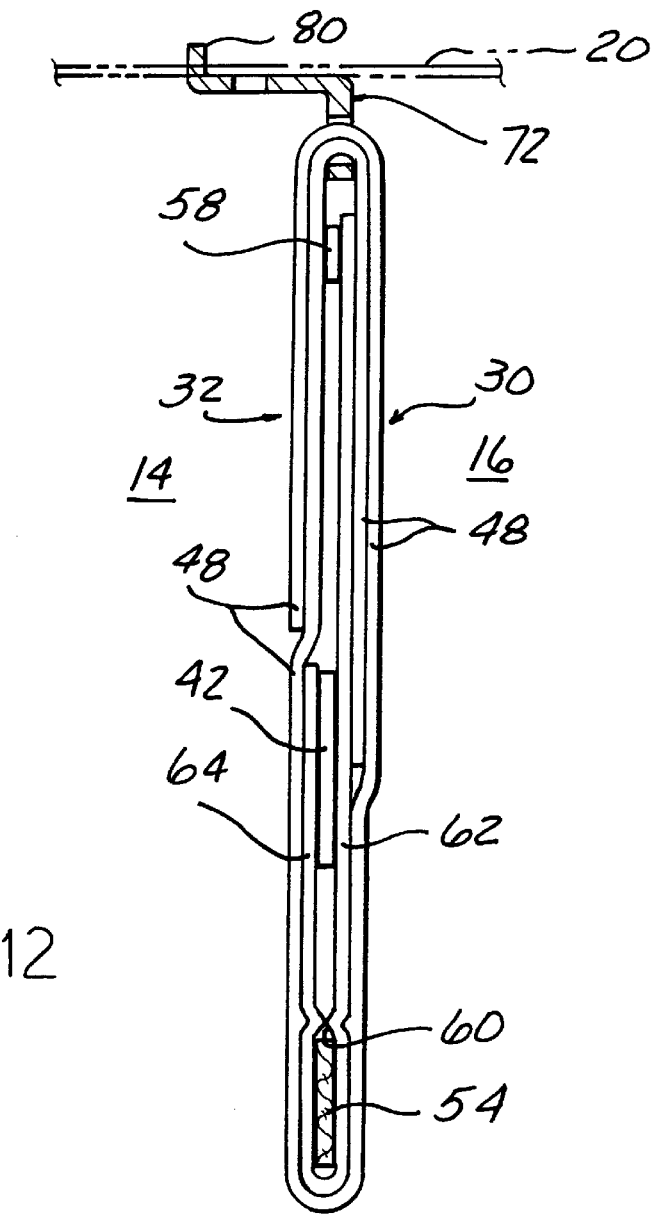
FIG. 12 is a side, partially cross sectional view taken on line 12—12 of FIG. 11.

The barrier body 28 has a front 30, a back 32, a top 34, a bottom 36, and two opposed sides 38, 40. As best seen in FIGS. 1 and 12, the front 30 is adapted to face the trunk compartment 16, and the back 32 is adapted to face the passenger compartment 14. The top 34 is adapted to be adjacent the package tray 20, the bottom 36 is adapted to be adjacent the bottom wall 22, and the two opposed sides 38, 40 are adapted to be adjacent the two opposed side walls 24, 26.

The barrier body 28 further comprises a substantially horizontal reinforcing member 42 extending between the two opposed sides 38, 40 and attached substantially at or below a midpoint 44 between the top 34 and the bottom 36. It is to be understood that reinforcing member 42 may be formed from any suitable material and in any suitable configuration so as to function appropriately as described herein. However, in the preferred embodiment, reinforcing member 42 comprises a fixed (as opposed to the slidably received lower flexible, substantially inelastic web strap 54 discussed further hereinbelow), flexible, substantially inelastic web strap. It is to be further understood that this reinforcing member web strap 42 may be formed from any suitable material, such as for example from polyesters, polypropylenes, nylons, and mixtures thereof; however, in the preferred embodiments, the material of choice is a reinforced multi-filament polypropylene.

Side web straps 48 (described further below) are generally stronger, and stretch less than center strap 42. Without being bound to any theory, it is believed that this focuses loads into a center, reinforced pocket area 148, which aids in preventing loads from breaking through device 10.

The barrier device 10 further comprises means adapted to attach the top 34 to the package tray 20; and means adapted to releasably attach the bottom 36 to the bottom wall 22 and/or the opposed side walls 24, 26 (the shock tower walls).

When the barrier device 10 is installed at the trunk forward end 18 and suspended between the passenger compartment 14 and the trunk compartment 16, cargo C of a predetermined mass in the trunk compartment 16 is restrained from entering the passenger compartment 14 under predetermined frontal crash conditions. The barrier device 10 of the present invention advantageously meets the requirements (as shown through High G sled tests) of the U.N. Regulation No. 17 as described hereinabove, ie. device 10 restrains cargo C comprising two blocks, each having a mass of 18 kg, wherein the frontal crash conditions include the speed on impact being between about 48.3 km/h and about 53.1 km/h, and a longitudinal horizontal deceleration of not less than about 20 g being applied for 30 milliseconds in the forward direction to motor vehicle.

Figure 2:
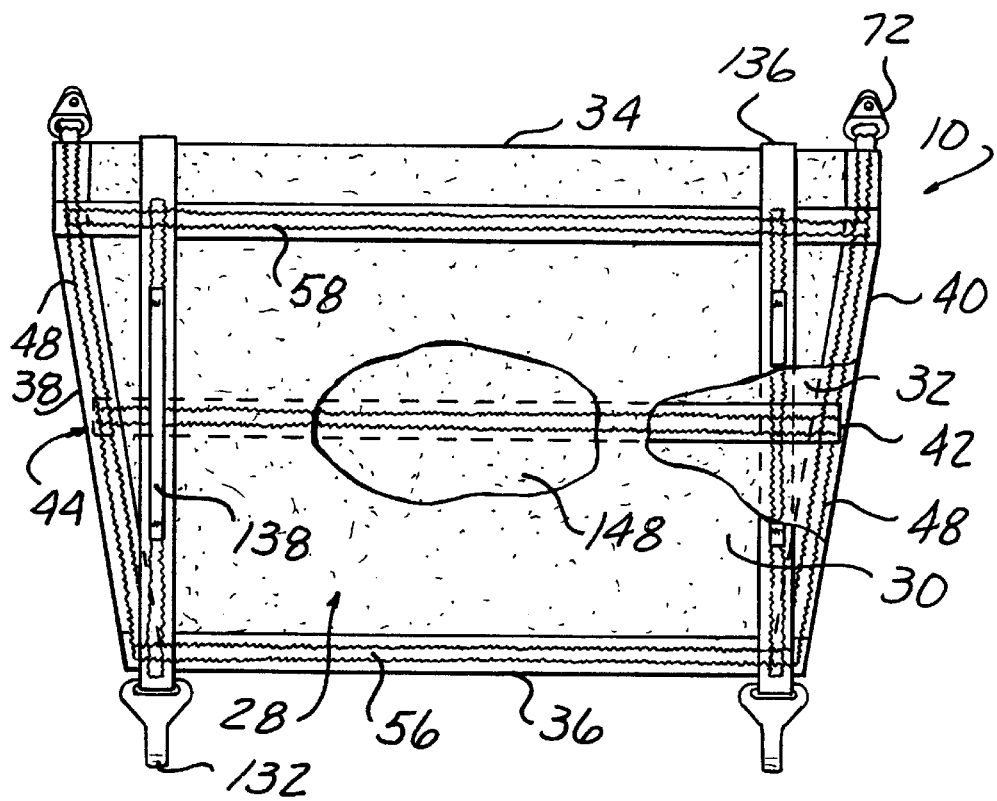
FIG. 2 is a front view of one embodiment of the barrier device of the present invention.
Figure 3:
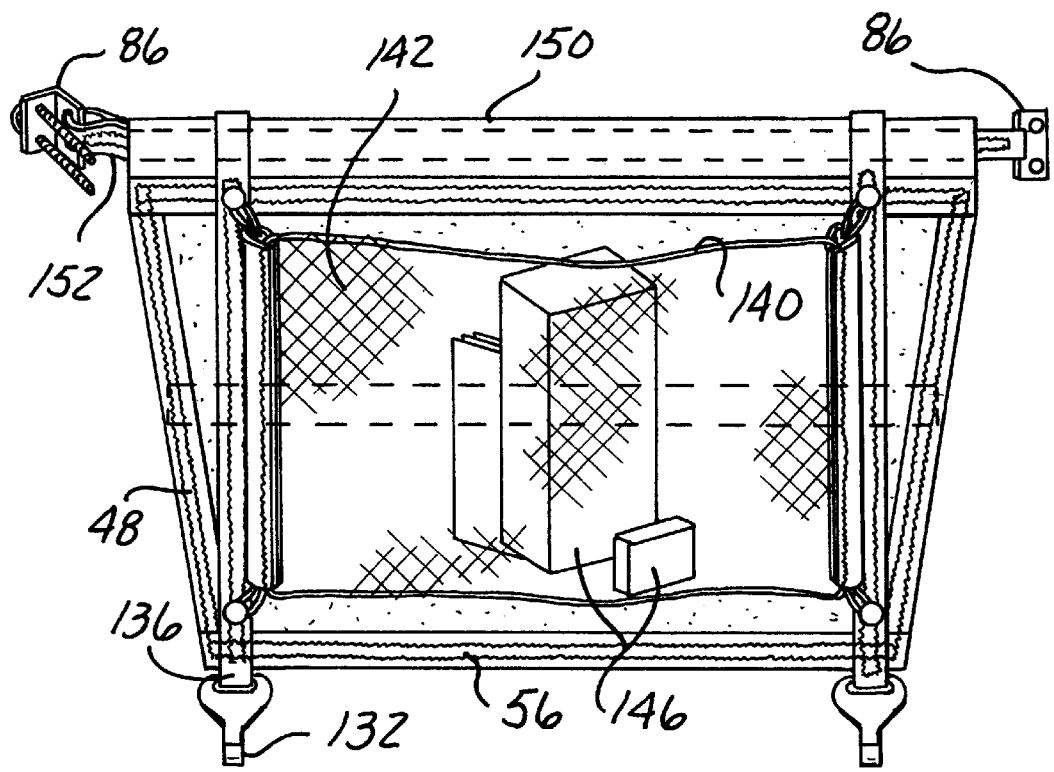
FIG. 3 is a rear view of the barrier device of FIG. 2, but showing an optional convenience net attached thereto with cargo therein.
Figure 5A:
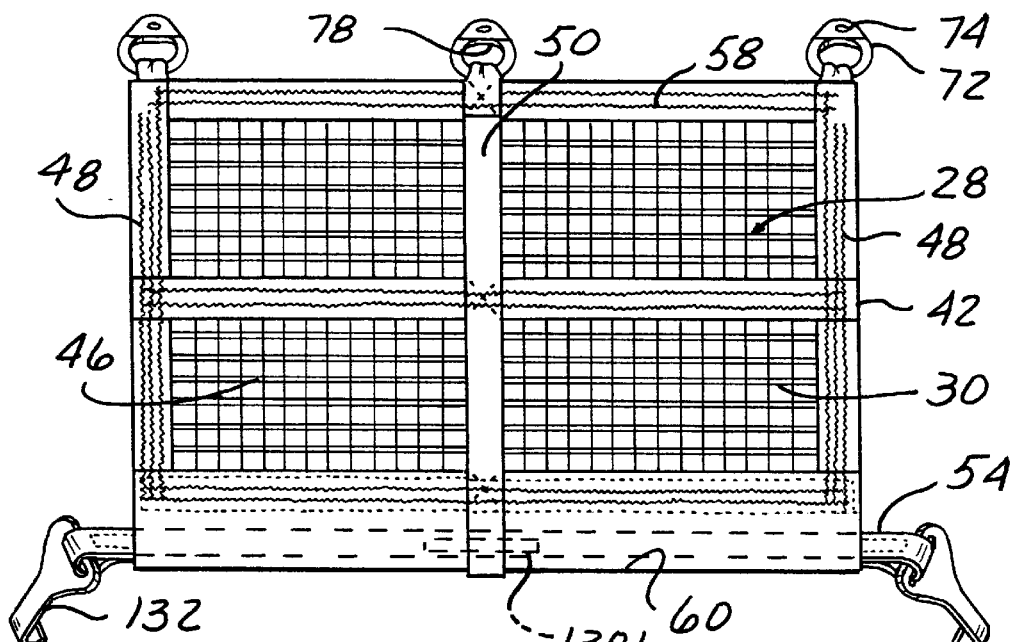
FIG. 5A is a front view of an alternate embodiment of the barrier device of the present invention.
Figure 5B:
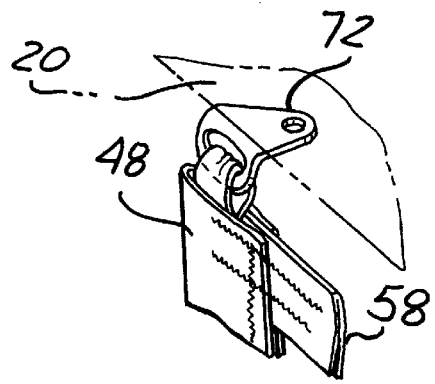
FIG. 5B is an enlarged, cutaway perspective view showing an upper bracket disposed adjacent the package tray (in phantom)
Figure 11:
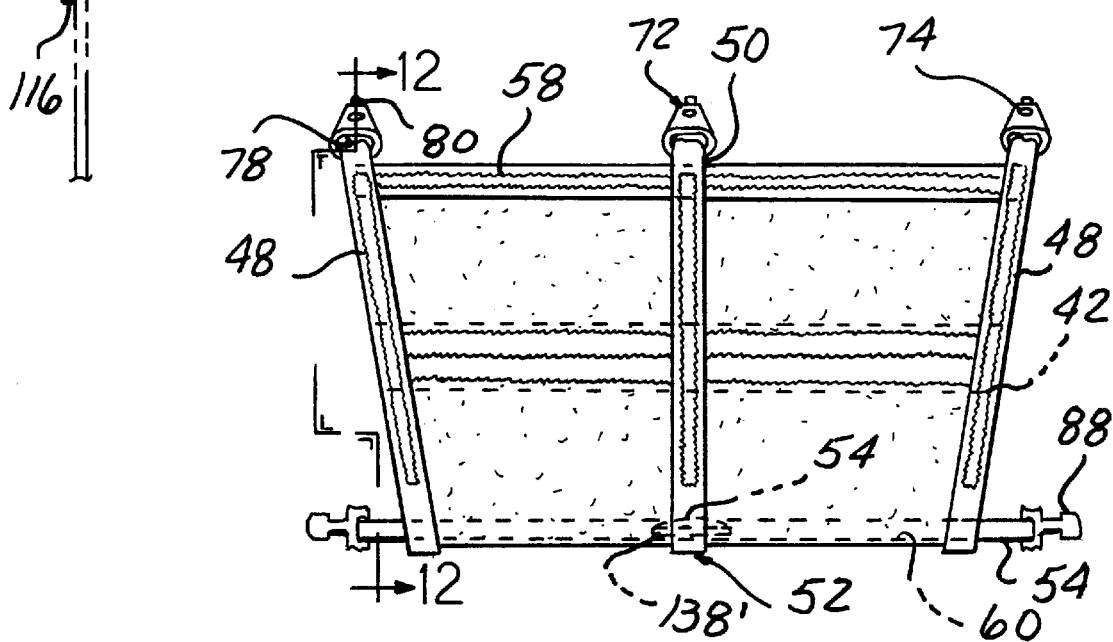
FIG. 11 is a front view of a further alternate embodiment of the barrier device of the present invention.

The barrier body 28 may further comprise a web strap 48 attached to each of the two opposed sides 38, 40. Still further, body 28 may comprises, as seen in FIGS. 5A and 11, a substantially vertical web strap 50 extending between the top 34 and the bottom 36 and attached at about a midpoint 52 between the two opposed sides 38, 40. Body 28 may further comprises a lower, substantially horizontal web strap 56 as shown in FIGS. 2 and 3. Alternately and/or additionally, body 28 may further comprise a sleeve 60 disposed at the bottom 36 and extending between the two opposed sides 38, 40. The flexible, substantially inelastic web strap 54 is longitudinally slidably received within the sleeve 60. Still further, body 28 may comprise an upper, substantially horizontal web strap 58.

It is to be understood that each of these web straps 48, 50, 54, 56 and 58 may be formed from any suitable material, such as for example from polyesters, polypropylenes, nylons, and mixtures thereof; however, in the preferred embodiment, the material of choice is a reinforced multi-filament polypropylene.

Further, it is to be understood that barrier body 28 may be made of one or multiple layers of a desired material. For example, as can best be seen in FIG. 2, the front 30 and back 32 of the barrier body 28 are double ply. Another example is shown in FIG. 5A wherein the front 30 and back 32 of the barrier body 28 are single ply. In the preferred embodiment, as best seen in FIG. 12, the front 30 and back 32 of the barrier body 28 are double ply from about the horizontal reinforcing member 42 to the bottom 36, and are singly ply from about the horizontal reinforcing member 42 to the top 34, ie. front 30 comprises a single ply 62 extending from top 34 to bottom 36, and back 32 comprises a single ply 64 extending from about the horizontal reinforcing member 42 to the bottom 36.

The barrier body 28 may be formed from a natural or synthetic cloth material, as shown in FIGS. 1–3, 11 and 12. It is to be understood that this cloth material may be formed from any suitable material. However, in the preferred embodiment, the cloth material is selected from the group consisting of polyesters, polypropylenes, nylons, and mixtures thereof. It is more preferred that the cloth material be formed from a polypropylene material. Such cloth material may be die cut, woven, and/or formed by any other suitable process.

In the more preferred embodiment as shown in FIG. 11, each of the web straps (upper horizontal 58, side 48, lower slidable 54 and vertical 50) and the horizontal reinforcing member 42 is formed from a reinforced multi-filament polypropylene material, and the barrier body 28 is formed from a polypropylene cloth material. This embodiment additionally is advantageous in that, due to the various polypropylene materials used, it is more environmentally friendly.

Figure 6A:
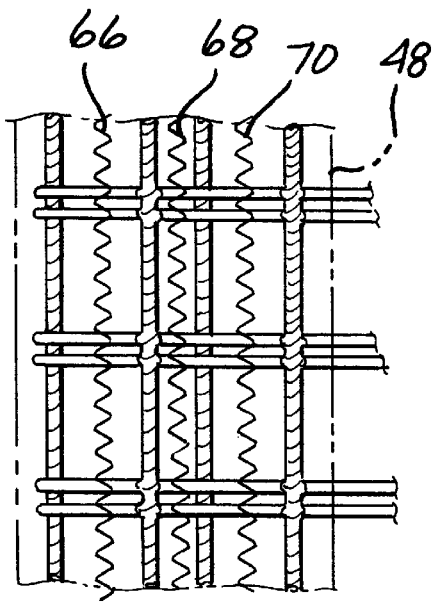
FIG. 6A is an enlarged view of one edge of the device of FIG. 5A, with the side web strap in phantom and showing the weft insertion netting folded over and sewn.
Figure 6B:
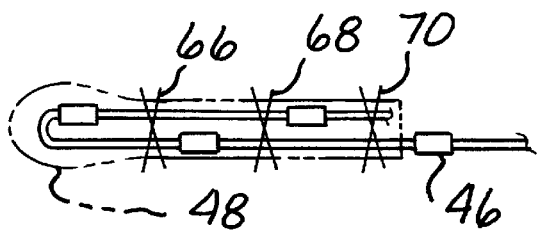
FIG. 6B is a top, schematic view of the view of FIG. 6A, detailing the 3 areas of stitching.
Figure 10:
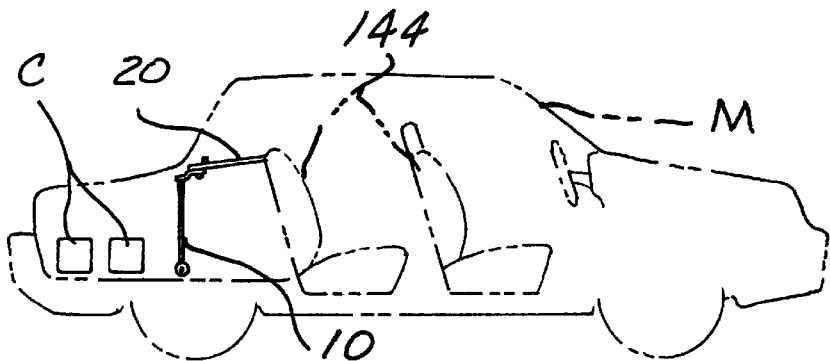
FIG. 10 is a side view of the device of the present invention, showing it installed in a motor vehicle (in phantom)

Referring now to FIG. 5A, barrier body 28 comprises a netting material 46. It is to be understood that the netting material 46 may be formed by at least one of woven, knitted, rochelle, and weft insertion processes, provided that the resultant netting material 46 is sufficiently strong to withstand predetermined loads. If a woven material, it is preferred that such material be of a relatively small mesh, eg. having small (1–2 mm) openings. Preferably, as shown in FIGS. 5A and 6A, netting material 46 is formed by a weft insertion process. When a netting material 46 is used, it is preferred that the edges of the material 46 at the sides 38, 40 be folded over as shown in FIGS. 6A and 6B. Further, it is preferred that the folded sides be stitched at the three areas shown 66, 68 and 70. Such sewing increases the area of the netting material 46 which is held by the thread 66, 68, 70 when the netting 46 is stressed during a frontal crash situation.

It is to be understood that the top attaching means may comprises any suitable means. However, in the preferred embodiment, this top attaching means comprises at least two brackets 72 (three are shown in the embodiments of FIGS. 5A and 11), each having an aperture 74 at one end adapted to correspond to a throughbore 76 in the package tray 20, and having a web strap (side 48 or vertical 50)—receiving slot 78 spaced a predetermined distance, and at a predetermined angle from the one end. Such predetermined distance and predetermined angle may be any as desired and/or necessitated by the particular configuration of the motor vehicle into which the device 10 is to be installed. Bracket 72 may optionally include a locating projection 80 which is receivable within a corresponding throughbore 82 in package tray 20, as best seen in FIG. 9.

Top attaching means further comprises at least two (three if the embodiment shown in FIGS. 5A and 11) shouldered bolts 84, each receivable within the aperture 74 and adapted to be threadingly engaged with the throughbore 76.

Figure 4:
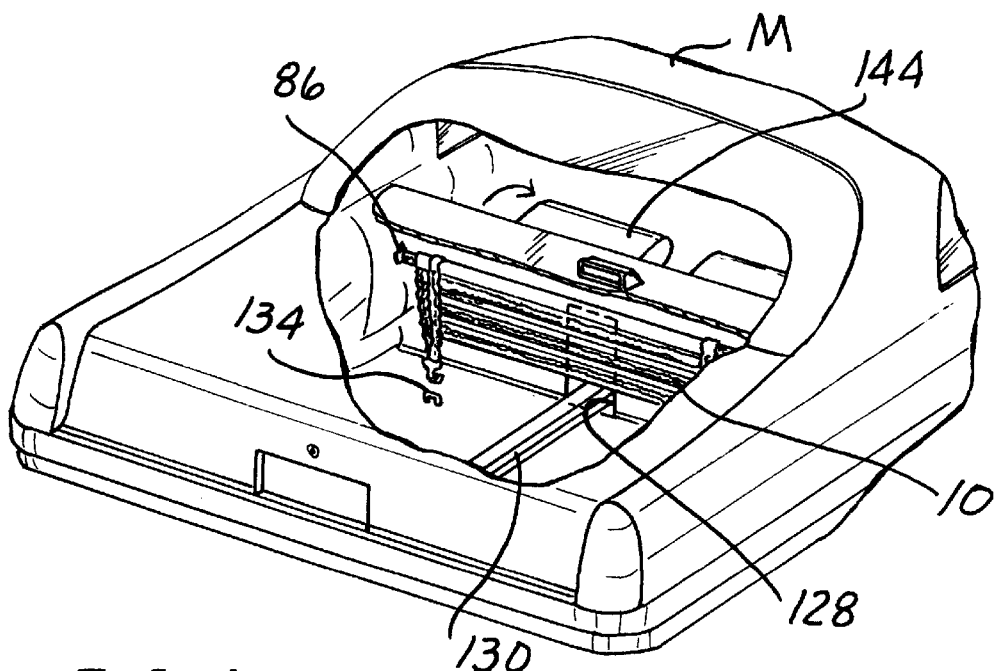
FIG. 4 is a cutaway perspective view showing the barrier device of the present invention installed within a motor vehicle, but detached at the bottom to allow for transportation of longer, pass-through cargo.

An alternate embodiment of the top attaching means, wherein the top of body 28 is attached to the opposed shock tower walls 24, 26, is illustrated in FIGS. 1, 3 and 4. It is to be understood that each of the embodiments of the top attaching means may be fixedly or semi-fixedly attached to the vehicle M (however, see the alternate embodiment described further hereinbelow wherein the top attaching means is releasably attachable). In this embodiment, barrier body 28 further comprises an upper sleeve 150 having an upper, slidable web strap 152 receivable therein.

It is to be understood that the upper attachment points 76 and/or 82 may be incorporated with the child tethers (not shown) in the package tray 20. Yet further, it is to be understood that the upper attachment points 76 and/or 82 may be incorporated with the strong, metal seat latch mechanism(s) (not shown) found at about the highest area of the seat and about at the area where the high mount stop light is/would be located. These mechanisms are generally found in more upscale automobile brands. Both of these alternates (the child tethers and/or the metal seat latch mechanisms) are desirable in that the hardware is pre-existing in current automobile designs.

It is to be understood that the bottom attaching means may comprise any suitable means. However, in the preferred embodiments, this releasable bottom attaching means comprises two substantially T-shaped key members 88, each having an elongated, sleeved web strap-receiving slot 90 distal from the cross-bar 92 of the T-shape. Although any suitable dimensions may be used as desired and/or necessitated by the vehicle into which device 10 is to be installed, shoulder region 96 of T-shaped key member is preferably between about 6 mm and about 8 mm from neck 98, with a desired maximum being at or about 10 mm from neck. The radius 100 at opposed ends of shoulder regions 96 is preferably about 1 mm, with a maximum of about 2 mm and/or any suitable radius which will avoid inadvertent ramping out of bracket 94. Angle 102 between neck 98 and shoulder 98 is preferably substantially 90° for promoting locking engagement in complementarily shaped bracket slot 104. As can best be seen in FIG. 8, when T-shaped key member 88 is lockingly engaged within lower bracket 94, angle 102 securely abuts against the adjacent surface in slot 104, and a discrete portion of cross bar 92 adjacent shoulder regions 96 extends through bracket slots 104.

Bottom attaching means further comprises two lower brackets 94, each having an aperture 106 at one end adapted to correspond to a throughbore 108 in each of the opposed side walls 24, 26. The lower bracket aperture 106 is adapted to receive a fastener 110 extending from behind the trunk side wall 24, 26 and through the side wall throughbore 108, each lower bracket 94 further having a substantially T-shaped key slot 112, lockingly engageable with the T-shaped key member 88, and spaced a predetermined distance, and at a predetermined angle from the lower bracket one end. Such predetermined distance and predetermined angle may be any as desired and/or necessitated by the particular configuration of the motor vehicle into which the device 10 is to be installed.

Fastener 110 may comprise any suitable fastener means as are conventionally used and/or known; however, in the preferred embodiment, fastener 110 comprises a backer plate 116 having a shouldered stud 118 attached thereto best seen in FIGS. 7 and 8.

Bottom attaching means any further comprise two flanged nuts 114, each threadingly engageable with the fastener 110, each nut 114 securely holding the lower bracket 94 against the shock tower wall 24, 26.

Figure 15:
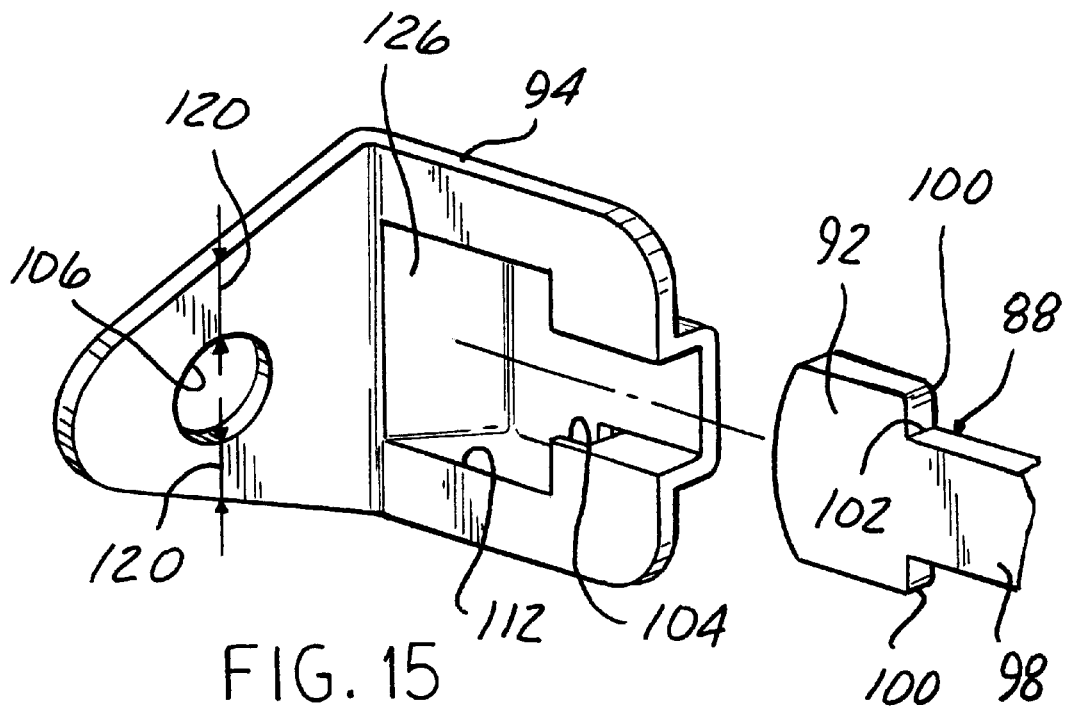
FIG. 15 is an enlarged, cutaway perspective view showing a further alternate embodiment of the lower attachment means.
Figure 16:
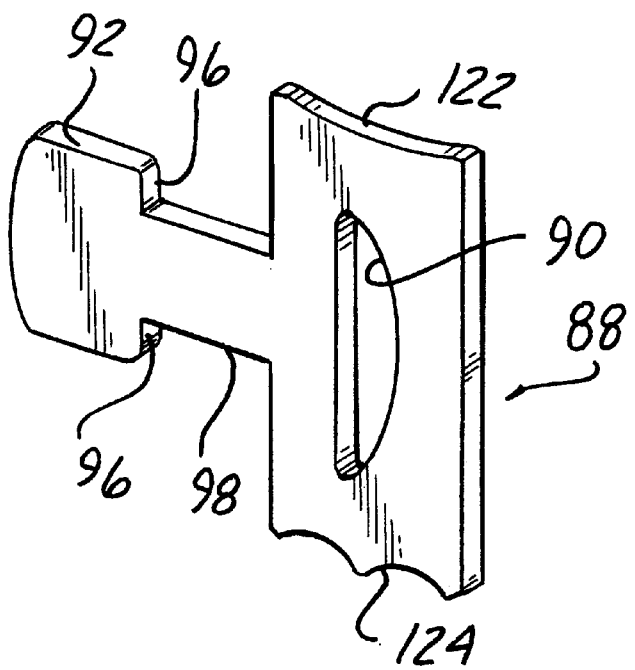
FIG. 16 is an enlarged perspective view of the T-shaped key member of FIG. 15.

Although it is to be understood that the key member 88 and bracket 94 may be of any suitable size and configuration provided they function suitably in the barrier device 10 of the present invention, the embodiment shown in FIGS. 15 and 16 is preferred. Although many dimensions may be suitable, in the preferred embodiment, aperture 106 on bracket 94 has a diameter of about 12 mm, with widths 120 on either side of aperture 106 being between about 10 mm and about 12 mm.

Each lower bracket may further comprise a ramp 126 adjacent the T-shaped key slot 112, the ramp 126 positioned so as to slidably urge the T-shaped key member 88 into locking engagement with the T-shaped key slot 112. It is to be understood that lower bracket 94 and key members 88 may be formed from any suitably strong material; however, in the preferred embodiment, the lower brackets 94 and the T-shaped key members 88 are formed from mild steel, which is a low carbon structural steel that is ductile and easily worked. A preferred mild steel is American Iron and Steel Institute AISI) grade 1010, although grades up to about 1030 may be suitable for use within the present invention. Some typical suitable grades of mild steel are 1006, 1008, 1010, 1012, 1015–1023, 1025 and 1026. It is to be understood that, in applications experiencing lower G forces, steel with higher carbon content and/or polymeric materials may successfully be used.

It is to be understood that one or multiple layers of web strap may secured through slots 78, 90. As illustrative examples, in the preferred embodiment as shown in FIG. 11, two layers of webbing pass through slot 78 and are attached to bracket 72; while three layers of webbing pass through slot 90 and are attached to bracket 88.

The embodiment of the lower attachment means shown in FIGS. 7 and 8, when formed from grade 1010 steel, was functional in a pull test up to 4,620 pounds. It is to be understood that the lower attachment means is not to be limited to withstanding loads only at or under 4,620 pounds; in fact, it is readily anticipated and contemplated as being within the purview of the present invention that such lower attachment means may withstand loads even much greater than 4,620 pounds. It is further anticipated that the embodiment as shown in FIGS. 15 and 16 would function as well or better in similar pull tests.

For aesthetic purposes, the bracket 94 and T-shaped key member 88 could be plated or the like; and/or aesthetically pleasing molded plastic covers may be placed over the metal.

The embodiment of the lower attachment means shown in FIGS. 15 and 16 is advantageously ergonomically designed with a palm receiving region 122 and finger receiving region 124 for easy and secure gripping by the installer and/or consumer when attaching or detaching the key member 88 into bracket 94 (thereby installing or uninstalling barrier device 10 into the vehicle M). There are substantially no finger pinch points, and the attachment means is easy to use. Additionally, this embodiment of the lower attaching means is simple and cost efficient to manufacture.

Bracket 94 may optionally further include a biased retaining tongue (not shown) for preventing inadvertent disengagement of key member 88 from bracket 94. It is to be understood that this retaining tongue may be of any suitable size and configuration and of any suitable material so as to serve this purpose. Retaining tongue should not, however, make it unreasonably difficult to detach key member 88 from bracket 94 when such detachment is desired (as in the case of pass-through cargo 130 described above).

Figure 13:
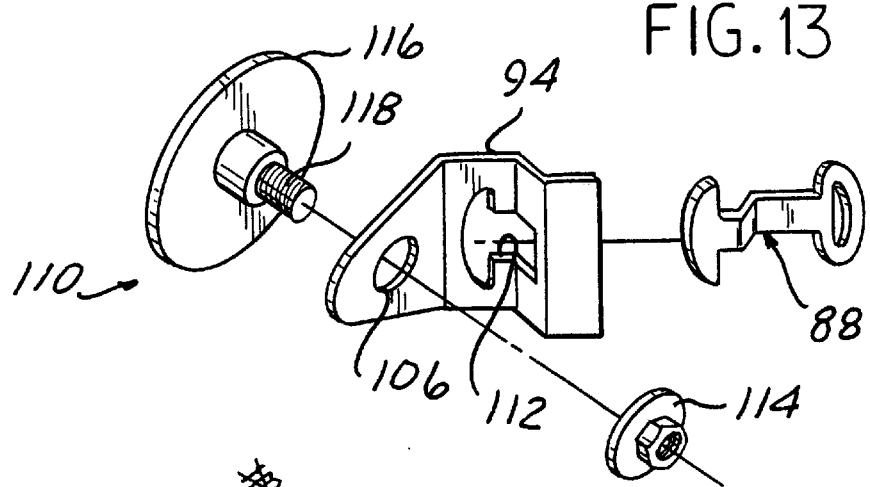
FIG. 13 is an exploded, perspective view showing an alternate embodiment of the lower attachment means.
Figure 14:
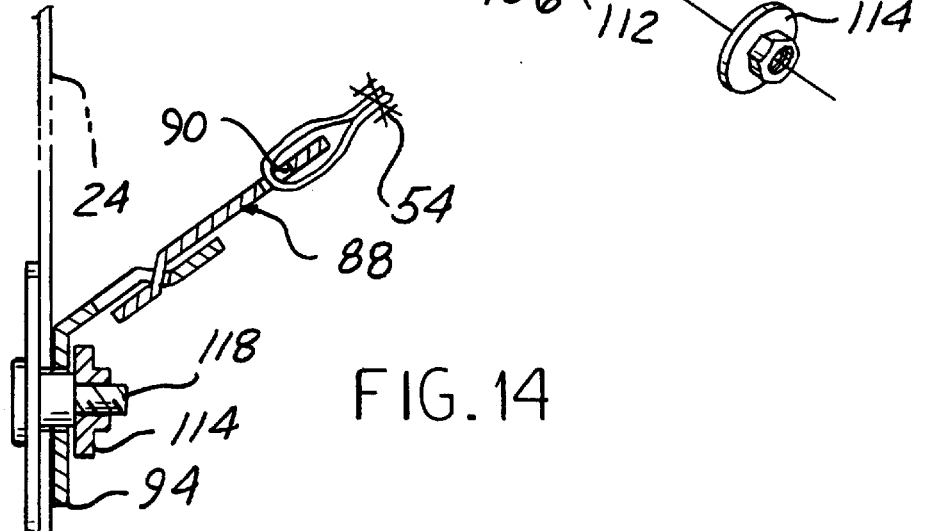
FIG. 14 is a cross sectional side view showing the lower attachment means of FIG. 13 in its installed state.

Another alternate configuration of the key member 88 and bracket 94 is shown in FIGS. 13 and 14.

The bottom attaching means may alternately comprise the hook 132 and loop-bracket 134 configuration shown in FIGS. 1–4. In this embodiment, the hooks 132 are attached to the lower ends of additional substantially vertical web straps 136 disposed substantially adjacent opposed sides 38, 40. Loop-brackets 134 are attached to the trunk bottom wall 22.

The barrier device 10 of the present invention optionally comprises an elastic member 138 on the web strap(s) having an attachment means at the corresponding end thereof. Elastic member 138 may comprise any suitable material and in any suitable size, shape and/or configuration. Elastic member 138 keeps barrier body 28 taut when attached and during normal driving conditions; yet yields enough that a consumer may easily attach/detach device 10 in vehicle M. Elastic member 138 provides a predetermined amount of transverse elasticity when attached to trunk bottom wall 22 (FIG. 2). Elastic member 138' provides a predetermined amount of longitudinal elasticity when attached to shock tower walls 24, 26 (FIGS. 5A, 11). Additionally, elastic member 138 may advantageously draw up device 10 a discrete amount when detached for pass through storage, as shown in FIG. 4. FIG. 5A shows elastic member 138' as it would appear in its taut position with device 10 fully installed in vehicle M - - - as can be seen, elastic member 138' is essentially parallel to web strap 54. FIG. 11 shows elastic member 138' as it would appear when device 10 is partially detached from vehicle M to allow for pass-through cargo 130. As can be seen in FIG. 11, elastic member 138' is no longer essentially parallel to web strap 54, but rather spaced a predetermined distance from web strap 54.

A selectively open space 128 extends between the passenger compartment 14 and trunk compartment 16. Space 128 is adapted to receive oversized items extending from the trunk compartment 16 into passenger compartment 14. Examples of such oversized items could be skis 130, as depicted in FIG. 4. Open space 128 may be any size or configuration, depending upon the make or model of a particular automobile. Open space 128 can be selectively opened or closed by any conventional means, depending on the model of the car. One example of this would be as shown in FIG. 4, where a middle portion between two bucket back seats is foldable down to open the space. Other examples include the entire back seat folding down, a 40/60, 30/70 and 50/50 seat split with either or both seats folding down, a small door opening, or any other suitable means to open the space 128 between the trunk compartment 16 and passenger compartment 14.

In order to utilize space 128, barrier device 10 may be lifted upward to allow the cargo 130 to pass through opening 128 by detaching the lower attachment means as shown in FIG. 4.

Barrier device 10 of the present invention may further optionally comprise a flat convenience net 142 forming a pocket 140 either attached to, or sewn into the front 30 and/or back 32 of barrier body 28. If attached to the back 32, the pocket 140 would be disposed between the barrier 10 and the seats 144; and if attached to the front 30, the pocket 140 would be disposed between the trunk compartment 16 and barrier 10. If pocket 140 is disposed between barrier 10 and seats 144, then this advantageously provides secure (not visible from either the passenger compartment unless the seats are folded down, and not visible from the trunk compartment 16 when a cloth material is used as the barrier body 28) and/or long term storage for cargo 146. Cargo 146 may be retrieved by folding seats 144 down, and/or by detaching barrier device 10 from its lower attachment point (s). If pocket 140 is disposed between trunk 16 and barrier 10, it may advantageously be used for short term such as ice scrapers, maps, tools and the like.

In a further alternate embodiment, the lower attachment means is fixed or semi-fixed, and the upper attachment means is detachable; ie. the embodiments of the various means shown hereinabove for the lower attachment means would be located at the top of the barrier body 28; while the embodiments of the various means shown hereinabove for the upper attachment means would be located at the bottom of barrier body 28. In this way, when desired for pass-through cargo, the device 10 would be detached from the package tray 20 and/or the shock tower walls 24, 26, and would advantageously settle to the trunk bottom wall 22 for easier cargo pass through.

It is to be understood that the embodiments shown, though preferred, are illustrative only. As such, it is to be understood that various features (including, but not limited to the absence or presence of various web straps, various attachment means, both upper and lower attachment, materials used, etc.) of all the embodiments shown may be mixed and/or matched to render yet other embodiments, which embodiments are contemplated as being within the scope of the present invention.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A load restraining barrier device for use in a motor vehicle, the vehicle having a body with a trunk compartment, the trunk compartment having a forward end with a top wall, a bottom wall, and two opposed side walls extending substantially upwardly from the bottom wall, the barrier device comprising:

a barrier body having a predetermined shape and adapted to be disposed at the forward end of the trunk compartment and suspended between the opposed side walls, the barrier body having a front, a back, a top, a bottom, and two opposed sides, the front adapted to face the trunk compartment, the bottom adapted to be adjacent the bottom wall, and the two opposed sides adapted to be adjacent the two opposed side walls;

at least one substantially horizontal reinforcing member extending between the two opposed sides;

means adapted to attach the top of the body to the top wall of the trunk compartment; and means adapted to releasably attach the bottom to at least one of the bottom wall and the opposed side walls;

wherein when the barrier device is installed at the forward end of the trunk compartment, cargo of a predetermined mass in the trunk compartment is restrained from leaving the trunk compartment through the barrier body under predetermined frontal crash conditions.

2. The barrier device as defined in claim 1 wherein the top attachment means comprises:

two brackets, each having an aperture at one end adapted to correspond to a throughbore in the top wall of the trunk compartment, the brackets having a side web strap-receiving slot spaced a predetermined distance, and at a predetermined angle from one end; and two shouldered bolts, each receivable within the aperture and adapted to be threadingly engaged with the throughbare.

3. The barrier device as defined in claim 1 further comprising a web strap attached to each of the two opposed sides.

4. The barrier device as defined in claim 1 wherein the reinforcing member comprises a fixed, flexible, substantially inelastic web strap.

5. The barrier device as defined in claim 1 wherein the barrier body is formed from a natural or synthetic cloth material.

6. The barrier device as defined in claim 5 wherein the cloth material is selected from the group consisting of polyesters, polypropylenes, nylons, and mixtures thereof.

7. The barrier device as defined in claim 6 wherein the cloth material is polypropylene.

8. The barrier device as defined in claim 1 further comprising:

a sleeve disposed at the top of the body and extending between the two opposed sides;

a flexible, substantially web strap longitudinally slidably received within the sleeve; and attachment means for attaching the top of the body to the opposed side walls.

9. The barrier device as defined in claim 1 wherein the bottom attachment means comprises:

two substantially T-shaped key members, each having an elongated, sleeved web strap-receiving slot distal from the cross-bar of the T-shape;

two lower brackets, each having an aperture at one end adapted to correspond to a throughbore in each of the opposed side walls, the lower bracket aperture adapted to receive a fastener extending from behind the trunk side wall and through the side wall throughbore, each lower bracket further having a substantially T-shaped key slot, lockingly engageable with the T-shaped key member, and spaced a predetermined distance, and at a predetermined angle from the lower bracket one end; and two flanged nuts, each threadingly engageable with the fastener, each nut securely holding the lower bracket against the trunk side wall.

10. The barrier device as defined in claim 1 further comprising:

a web strap attached to each of the two opposed sides; and wherein means adapted to attach the top of the body to the top wall of the trunk compartment comprises:

two brackets, each having an aperture at one end adapted to correspond to a throughbore in the top wall of the trunk compartment, and having side web strap-receiving slot spaced a predetermined distance, and at a predetermined angle from one end; and two shouldered bolts, each receivable within the aperture and adapted to be threadingly engaged with the throughbore.

11. The barrier device as defined in claim 1 wherein the cargo comprises two blocks, each having a mass of 18 kg, and the frontal crash conditions include the speed on impact being between about 48.3 km/h and about 53.1 km/h, and a longitudinal horizontal deceleration of not less than about 20 g being applied for 30 milliseconds in the forward direction to motor vehicle.

12. A load restraining barrier device for use in a motor vehicle, the vehicle having a body with a trunk compartment, the trunk compartment having a forward end with a bottom wall, and two opposed side walls extending substantially upwardly from the bottom wall, the trunk compartment defined at least in part by a package tray, the barrier device comprising:

a barrier body having a predetermined shape and adapted to be disposed at the forward end of the trunk compartment and suspended between the opposed side walls, the barrier body including side straps each having a top and a bottom, wherein the side straps are fixed, flexible, substantially inelastic web straps;

at least one substantially horizontal reinforcing member extending between the two opposed sides;

means affixed to the top of each side strap adapted to attach to the package tray; and means affixed to the bottom of each side strap adapted to attach to the trunk compartment.

13. The barrier device as defined in claim 12 wherein the attachment means affixed to the top of the barrier body is adapted to be attachable to the opposed side walls, and the attachment affixed to the bottom of the barrier body is adapted to attached to at least one of the bottom wall and the opposed side walls.

14. The barrier device as defined in claim 13 wherein the top attaching means comprises:

two brackets, each having an aperture at one end adapted to correspond to a throughbore in the package tray, and having side web strap-receiving slot spaced a predetermined distance, and at a predetermined angle from one end; and two shouldered bolts, each receivable within the aperture and adapted to be threadingly engaged with the throughbore.

15. The barrier device as defined in claim 12 wherein the bottom attachment means are releasably attached to at least one of the bottom wall and the opposed side walls.

16. The barrier device as defined in claim 13 further comprising:

at least one substantially vertical web strap extending between the top wall and the bottom wall, wherein the vertical web strap comprises means adapted to attach the top of the web strap to the package tray and means adapted to attach the bottom of the web strap to the bottom wall.

17. In a vehicle having a trunk defined at least in part by a package tray, the combination of the vehicle with a restraining barrier disposed in the trunk, the improvement comprising:

means for attaching the restraining barrier to the package tray.

18. The improvement of claim 17 wherein the attaching means further comprises:

a web mount engageable with a top portion of the restraining barrier and with the package tray to attach the restraining barrier with respect to the package tray.

19. The improvement of claim 18 further comprising:

a reinforcing member horizontally extending between opposite ends of the restraining barrier between the top portion of the restraining barrier and a bottom portion of the restraining barrier.

20. The improvement of claim 19 further comprising:

a second reinforcing member vertically extending between the top portion and the bottom portion and disposed between the opposite ends of the restraining barrier.

* * * * *